US010636100B2

(12) United States Patent
Saft et al.

(10) Patent No.: US 10,636,100 B2
(45) Date of Patent: Apr. 28, 2020

(54) SYSTEM AND METHOD FOR PREDICTION OF VALUE ADDED TAX RECLAIM SUCCESS

(71) Applicants: Isaac Saft, Kfar Neter (IL); Noam Guzman, Ramat Hasharon (IL)

(72) Inventors: Isaac Saft, Kfar Neter (IL); Noam Guzman, Ramat Hasharon (IL)

(73) Assignee: VatBox, Ltd., Herzeliya (IL)

( * ) Notice: Subject to any disclaimer, the term of this patent is extended or adjusted under 35 U.S.C. 154(b) by 330 days.

(21) Appl. No.: 14/272,825

(22) Filed: May 8, 2014

(65) Prior Publication Data

US 2014/0244458 A1 Aug. 28, 2014

Related U.S. Application Data

(63) Continuation-in-part of application No. PCT/IL2014/050201, filed on Feb. 27, 2014.

(60) Provisional application No. 61/820,795, filed on May 8, 2013, provisional application No. 61/769,786, filed on Feb. 27, 2013.

(51) Int. Cl.
G06Q 40/00 (2012.01)
(52) U.S. Cl.
CPC .................... G06Q 40/10 (2013.01)
(58) Field of Classification Search
CPC ........ G06Q 30/00; G06Q 40/00; G06Q 17/60; G06K 9/00
USPC ........................................................ 705/31
See application file for complete search history.

(56) References Cited

U.S. PATENT DOCUMENTS

| 5,258,908 A | 11/1993 | Hartheimer et al. |
| 5,586,787 A | 12/1996 | Brown et al. |
| 5,903,876 A | 5/1999 | Hagemier |
| 6,003,016 A | 12/1999 | Hagemier |
| 6,144,726 A | 11/2000 | Cross |
| 6,233,565 B1 | 5/2001 | Lewis et al. |
| 6,546,373 B1* | 4/2003 | Cerra .................... G06Q 20/10 705/19 |
| 7,234,103 B1 | 6/2007 | Regan |
| 7,269,407 B2 | 9/2007 | Carmon et al. |
| 7,555,444 B1 | 6/2009 | Wilson et al. |
| 7,561,734 B1 | 7/2009 | Wnek |
| 7,603,301 B1 | 10/2009 | Regan |

(Continued)

FOREIGN PATENT DOCUMENTS

| JP | 2011147912 A | 8/2011 |
| JP | 2012519889 A | 8/2012 |

(Continued)

OTHER PUBLICATIONS

PCT International Search Report for PCT/IL2014/050201, Israel Patent Office, Jerusalem, Israel, dated Jun. 19, 2014.

(Continued)

Primary Examiner — Clifford B Madamba
(74) Attorney, Agent, or Firm — M&B IP Analysts, LLC

(57) ABSTRACT

A method and system for predicting a likelihood of success of a potential value-added tax (VAT) reclaim are provided. The method includes receiving at least one VAT receipt; analyzing the at least one VAT receipt; retrieving information respective of likelihood of success respective of the VAT receipt analysis; and determining the likelihood of success of the potential VAT reclaim.

19 Claims, 6 Drawing Sheets

(56) References Cited

U.S. PATENT DOCUMENTS

| | | | |
|---|---|---|---|
| 7,769,695 B2* | 8/2010 | Robinson | G06Q 20/04 235/381 |
| 7,809,614 B2 | 10/2010 | Von Drehnen et al. | |
| 7,954,710 B1 | 6/2011 | Lee | |
| 7,983,966 B2 | 7/2011 | Ostlund | |
| 8,060,442 B1 | 11/2011 | Hecht et al. | |
| 8,204,438 B2 | 6/2012 | Patel et al. | |
| 8,332,278 B2 | 12/2012 | Woolston | |
| 8,341,028 B2 | 12/2012 | Woolston | |
| 2003/0011799 A1 | 1/2003 | Kobziar et al. | |
| 2003/0055733 A1 | 3/2003 | Marshall et al. | |
| 2004/0002906 A1 | 1/2004 | Von Drehnen et al. | |
| 2004/0068452 A1 | 4/2004 | Ullrich et al. | |
| 2005/0021410 A1 | 1/2005 | Ostlund | |
| 2005/0096989 A1 | 5/2005 | Ostlund | |
| 2005/0097019 A1 | 5/2005 | Jacobs | |
| 2005/0261967 A1 | 11/2005 | Barry et al. | |
| 2007/0138295 A1 | 6/2007 | White | |
| 2008/0051931 A1 | 2/2008 | Ishida | |
| 2008/0110985 A1 | 5/2008 | Cohen et al. | |
| 2008/0204233 A1 | 8/2008 | Agrawal et al. | |
| 2008/0255971 A1 | 10/2008 | McKinnon et al. | |
| 2009/0112743 A1 | 4/2009 | Mullins et al. | |
| 2009/0146816 A1 | 6/2009 | Patel et al. | |
| 2010/0238039 A1 | 9/2010 | Tethrake et al. | |
| 2010/0325050 A1 | 12/2010 | Ito et al. | |
| 2011/0016016 A1 | 1/2011 | Woolston | |
| 2011/0016043 A1 | 1/2011 | Dornseif | |
| 2011/0022485 A1 | 1/2011 | Von Drehnen et al. | |
| 2011/0022486 A1 | 1/2011 | Von Drehnen et al. | |
| 2011/0081051 A1* | 4/2011 | Tayal | G06K 9/036 382/112 |
| 2011/0125561 A1 | 5/2011 | Marcus | |
| 2011/0307405 A1 | 12/2011 | Hammer et al. | |
| 2012/0253852 A1 | 10/2012 | Pourfallah et al. | |
| 2012/0303425 A1 | 11/2012 | Katzin et al. | |
| 2012/0310806 A1 | 12/2012 | Carter | |
| 2013/0275238 A1 | 10/2013 | Ramaratnam et al. | |
| 2013/0346142 A1* | 12/2013 | Young | G06Q 30/02 705/7.28 |
| 2014/0180883 A1 | 6/2014 | Regan | |
| 2014/0214519 A1 | 7/2014 | Ekster | |
| 2014/0229305 A1 | 8/2014 | Ellan | |

FOREIGN PATENT DOCUMENTS

| | | | | |
|---|---|---|---|---|
| WO | WO 2006/022589 A1 * | 8/2004 | | G06F 17/60 |
| WO | WO 2011/147914 A1 * | 5/2011 | | G06Q 30/00 |
| WO | 2011147912 A1 | 12/2011 | | |
| WO | WO-2011147914 A1 | 12/2011 | | |

OTHER PUBLICATIONS

Foreign Office Action for Patent Application in Spain No. P201590095, OEPM, Madrid, Spain, dated Sep. 28, 2015.

Second Foreign Office Action for Patent Application in Spain No. P201590095, OEPM, Madrid, Spain, dated Jan. 19, 2016.

The First Office Action for Chinese Patent Application No. 201480010734.6 dated Jul. 27, 2018, SIPO, China.

Preliminary Notice of Reasons for Rejection for Japanese Patent Application No. 2015-558607 dated Oct. 25, 2018.

Examination Report Under Section 18(3) for GB 1514813.3 dated Sep. 2019, Intellectual Property Office, South Wales, United Kingdom.

Preliminary Notice of Reasons for Rejection for Japanese Patent Application No. 2015-558607 dated Nov. 29, 2017.

The Second Office Action for Chinese Patent Application No. 201480010734.6 dated Jun. 20, 2019, CNIPA, China.

* cited by examiner

SYSTEM AND METHOD FOR PREDICTION OF VALUE ADDED TAX RECLAIM SUCCESS

CROSS-REFERENCE TO RELATED APPLICATIONS

This application claims the benefit of U.S. Provisional Application No. 61/820,795, filed on May 8, 2013, the contents of which are hereby incorporated by reference. This application is also a continuation-in-part of International Application No. PCT/IL2014/050201, filed on Feb. 27, 2014, which claims the benefit of U.S. Provisional Application No. 61/769,786 filed Feb. 27, 2013, the contents of which are hereby incorporated by reference for all that they contain.

TECHNICAL FIELD

The present invention relates generally to value-added tax (VAT) refunding and, more particularly, to predicting VAT reclaim success.

BACKGROUND

The Value Added Tax, or VAT, is a broadly based consumer tax assessed on the value added to goods and services. It applies more or less to all goods and services that are bought and sold for use or consumption in a community. It should be noted that, even when a person can claim a refund of a VAT, the person is nevertheless required to pay the VAT at the point of purchase and subsequently reclaim the VAT paid retroactively.

The laws and regulations of many countries allow foreign travelers the right for reimbursement or a refund of certain taxes such as, e.g., VATs paid for goods and/or services abroad. As such laws and regulations are different from one country to another, determination of the actual VAT refunds that one is entitled to receive often requires that the seeker of the refund possess a vast amount of knowledge in the area of tax laws abroad. Moreover, travelers may seek refunds for VATs when they are not entitled to such refunds, thereby spending time and effort on a fruitless endeavor. Further, availability of the VAT refund may vary based on the type of purchase made and the presence of a qualified VAT receipt.

One procedure to request a refund is to physically approach a customs official at an airport, fill out a form, and file the original receipts respective of the expenses incurred during the visit. This procedure should be performed prior to checking in or boarding to the next destination. Additionally, particularly with respect to goods purchased abroad, the procedure to request a refund may require that the payer show the unused goods to a custom official to verify that the goods being exported match the goods that the payer paid VATs on.

As travelers are not familiar with specific laws and regulations for claiming a refund, the travelers may claim for a refund even though they are not eligible. This procedure further unnecessarily wastes time if the traveler ultimately learns that he or she is not entitled to a refund.

It would therefore be advantageous to provide a solution that would allow to predict the likelihood of success of a potential VAT reclaim.

SUMMARY

Certain exemplary embodiments include a method for predicting a likelihood of success of a potential value-added tax (VAT) reclaim. The method includes receiving at least one VAT receipt; analyzing the at least one VAT receipt; retrieving, respective of the VAT receipt analysis, information respective of likelihood of success; and determining the likelihood of success of the potential VAT reclaim.

Certain exemplary embodiments also include a system for predicting a likelihood of success of a potential VAT reclaim. The system includes a processor; and a memory, wherein the memory contains instructions that, when executed by the processor, configure the system to: receive at least one VAT receipt; analyze the at least one VAT receipt; retrieve, respective of the VAT receipt analysis, information respective of likelihood of success; and determine the likelihood of success of the potential VAT reclaim.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
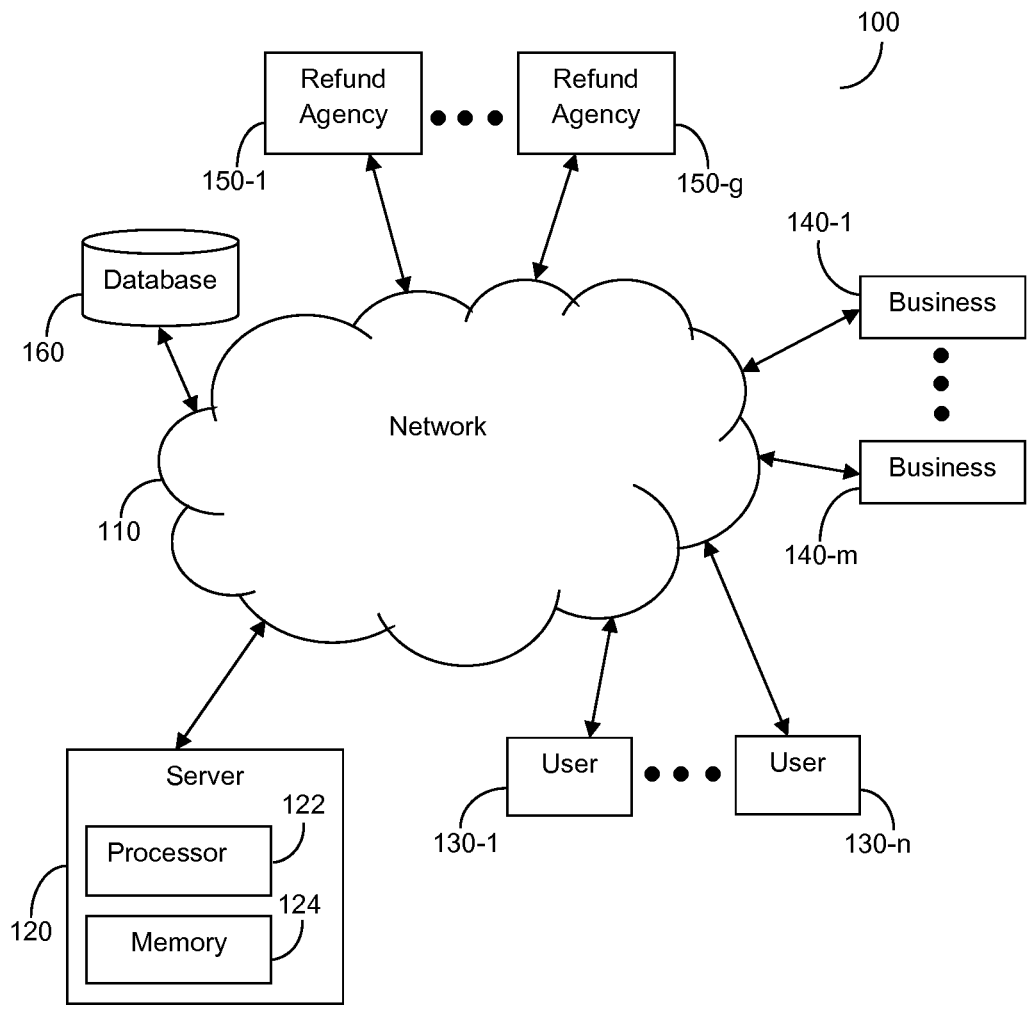
FIG. 1 is a schematic block diagram of a system for analyzing VAT refunds according to an embodiment.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting schematic diagram of a system for VAT refunds 100 according to one embodiment. The system 100 includes a network 110, a server 120, a plurality of user nodes 130-1 through 130-*n*, a plurality of business nodes 140-1 through 140-*m*, a plurality of refund agency nodes 150-1 through 150-*g*, and a database 160. The network 110 can be a local area network (LAN), a wide area network (WAN), a metro area network (MAN), the worldwide web (WWW), the Internet, implemented as wired and/or wireless networks, or any combinations thereof.

The server 120 is communicatively connected to the network 110. The server 120 includes a processing unit further including, e.g., a processor 122 and a memory 124. The system 100 also includes one or more user nodes 130-1 through 130-*n* (for the sake of simplicity and without limitation, such nodes may be referred to collectively as user nodes 130 or individually as a user node 130), that are also communicatively connected to the network 110. The system 100 further includes one or more business nodes 140-1 through 140-m (for the sake of simplicity and without limitation, such nodes may be referred to collectively as business nodes 140 or individually as a business node 140) that are communicatively connected to the server 120 via the network 110.

A business operating a business node 140 such as, for example, business node 140-1, may be, but is not limited to, a hotel, a shop, a service provider, and the like. One or more refund agency nodes (RANs) 150-1 through 150-g (for the sake of simplicity and without limitation, such nodes may be referred to collectively as RANs 150 or individually as a RAN 150) are also communicatively connected to the server 120 via the network 110. An officer or agent operating a RAN 150 such as, for example, RAN 150-1, may be, but is not limited to, a tax authority, an accountant, and the like. Each one of the user nodes 130, the business nodes 140, and the RAN nodes 150 may be a personal computer (PC), a notebook computer, a cellular phone, a smartphone, a tablet device, and the like.

The system 100 also typically includes a database 160 communicatively connected to the memory 124. The server 120 may be configured to store information respective of an applicant in the database 160. Such applicant information may include a user who submitted one or more VAT receipts, the submitted VAT receipts, conditions respective of laws related to VAT refund in a variety of countries, and so on. The conditions related to VAT refund may include, but are not limited to, a minimum required total purchase price, a list of businesses in which a VAT refund is possible, whether there is an obligation to disclose all information needed respective of goods that are mentioned in the VAT receipt, whether there is an obligation to disclose all information needed respective of an applicant who submitted the VAT receipt, whether the potential VAT reclaim depends on a non-commercial purchase of goods, etc.

The server 120 may use the information stored in the database 160 such as by, for example, retrieving information of an applicant required for the VAT refund. Such information may include, but is not limited to, passport details, a passport photo, an electronic copy of a passport, etc. According to one embodiment, the information stored in the database 160 may be received from an external source. Such external source may be, but is not limited to, a user node 130 or a business node 140.

When a potential VAT reclaim is identified, the server 120 may perform authenticity analysis for one or more VAT receipts received respective of the information stored in the database 160. According to one embodiment, the server 120 is configured to identify a forgery or a duplicated copy of a VAT receipt. In an embodiment, the server 120 is configured to analyze each VAT receipt received to determine its eligibility for a VAT refund.

Figure 2:
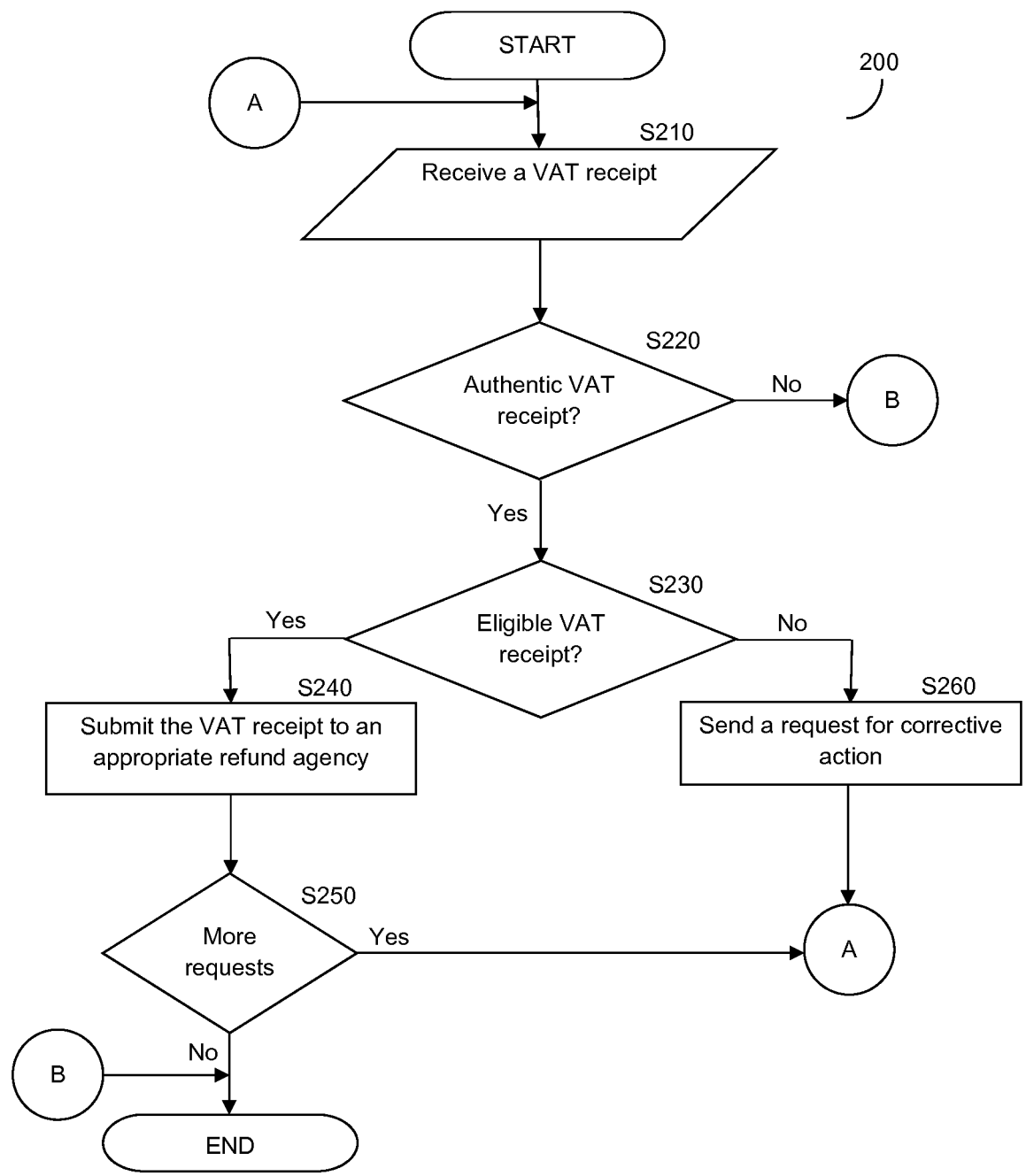
FIG. 2 is a flowchart illustrating processing of potential VAT reclaims according to an embodiment.

According to another embodiment, the server 120 is further configured to identify one or more unacceptable parameters. Parameters may be unacceptable if they are, for example, missing or unclear in the received VAT receipt. The server 120 may also be configured to send a request to perform corrective actions upon identification of one or more unacceptable parameters within the received VAT receipt. The request may be sent to a user node 130, or to a business node 140. The server 120 is configured to submit the VAT receipt to a RAN 150 upon identification of an eligible VAT receipt FIG. 2 depicts an exemplary and non-limiting flowchart 200 of a method for VAT reclaim processing according to one embodiment. It should be noted that, although discussion of FIG. 2 may be made with respect to the system 100 described in FIG. 1, the steps of this flowchart may be performed with respect to another system without departing from the scope of the disclosed embodiments.

In S210, at least one VAT receipt is received. According to one embodiment, the VAT receipt may be provided by a business node 140 or, alternatively, by a user node 130. In S220, it is checked whether the VAT receipt is an authentic VAT receipt and, if so, execution continues with S230; otherwise, execution terminates. The check may be made respective of information stored in a database (e.g., database 160). Authentication checking is discussed further herein below with respect to FIG. 4.

In S230, it is checked whether the VAT receipt is an eligible VAT receipt and, if so, execution continues with S240; otherwise, execution continues with S260. Eligibility checking is discussed further herein below with respect to FIG. 5.

In S240, the VAT receipt is submitted to an appropriate or otherwise preferred RAN 150. The RAN selection may be based on factors such as, but not limited to, effectiveness in receiving refunds, location, and so on. In S250, it is checked whether there are additional requests and, if so, execution continues with S210; otherwise, execution terminates.

In S260, a request for corrective action with respect to the VAT receipt is sent upon identification of an ineligible VAT receipt. The request may be sent to the user node 130 or the business node 140 who provided the VAT reclaim. Corrective action may include, for example, re-uploading an image of the receipt, providing a new receipt, and the like. After corrective action has been taken, execution continues with S210.

Figure 3:
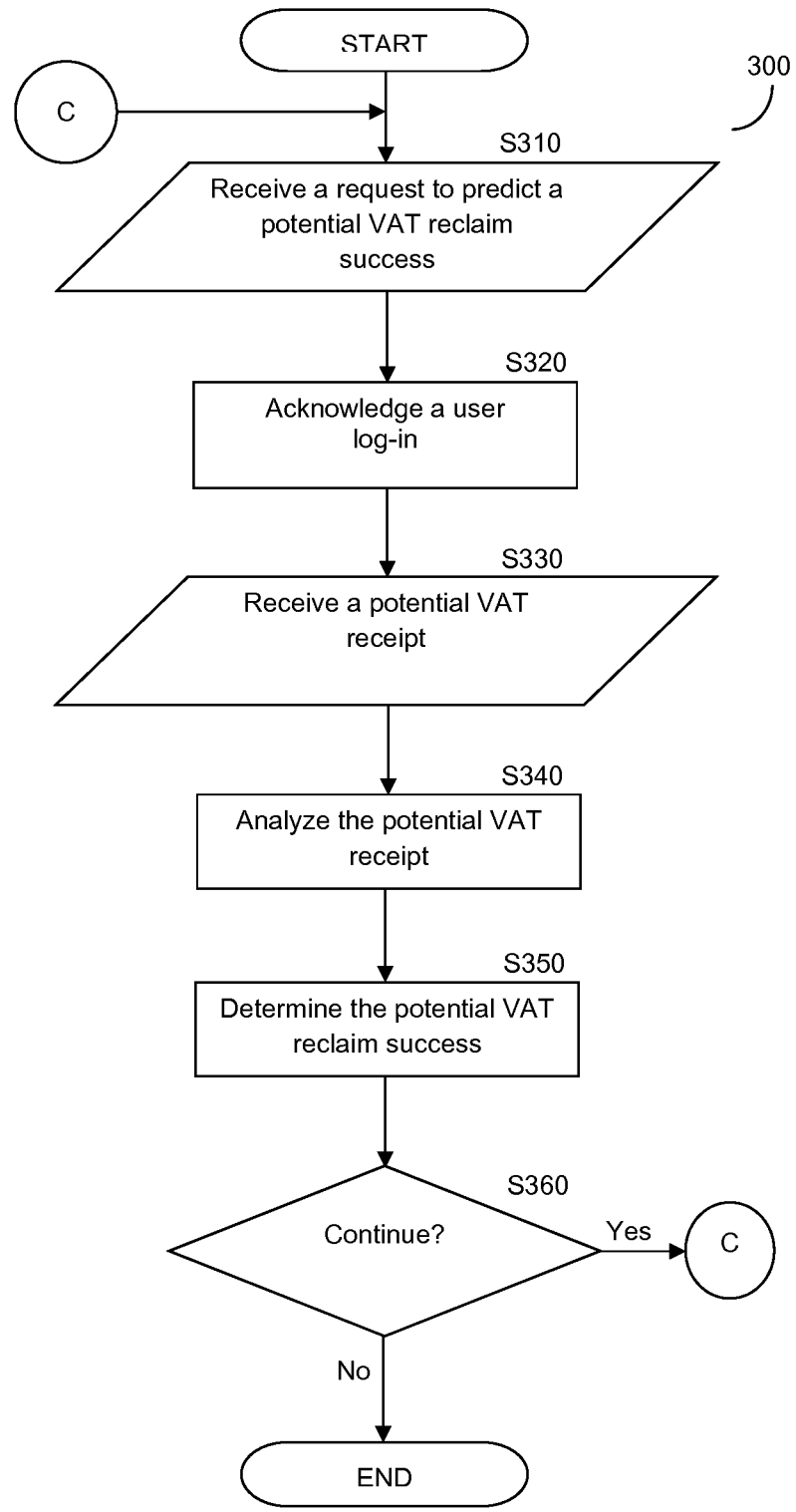
FIG. 3 is a flowchart illustrating the prediction of a likelihood of success of a potential VAT reclaim according to an embodiment.

FIG. 3 depicts an exemplary and non-limiting flowchart 300 for predicting a likelihood of success of a potential VAT reclaim according to one embodiment. It should be noted that, although discussion of FIG. 3 will be made with respect to the system 100 described in FIG. 1, the steps of this flowchart may be performed with respect to another system without departing from the scope of the disclosed embodiments.

In S310, a request to predict the likelihood of success of a potential VAT reclaim for a VAT receipt is received. The request may be received through a log-in process of a user on a user node 130, thereby the "prediction" request is initiated and sent by a user node 130.

In S320, a user log-in is acknowledged via identification of a user node (e.g., user node 130). Such acknowledgment may include verification of the user credentials against detailed saved in the database 160. In S330, the VAT receipt is received from, for example, the user node 130. Alternatively, the VAT receipt may be retrieved from a database (e.g., database 160).

As noted above, the database 160 maintains information for VAT refunds such as, for example, information respective of users, one or more VAT receipts, conditions respective of laws related to VAT refund in a variety of countries, etc. The conditions related to VAT refund may include, but are not limited to, a minimum required total purchase price, a list of businesses in which a VAT refund is possible, whether there is an obligation to disclose all information needed respective of goods that are mentions in the VAT receipt, whether there is an obligation to disclose all information needed respective of an applicant who submitted the VAT receipt, whether the potential VAT reclaim may depends on a non-commercial purchase of goods, and so on.

In S340, the VAT receipt is analyzed to determine the user eligibility for the VAT refund. Analysis of a VAT receipt may include, but is not limited to, scanning the receipt, determining information contained in the receipt based on digital image and/or word recognition, receiving information from a user or business, and so on.

According to one embodiment, a target country in which the potential VAT reclaim is processed may be identified. Additionally, it may be checked whether the VAT receipt complies with laws in the target country. It is determined if the VAT receipt does not support one or more conditions required in order to receive the VAT refund in the target country. Such identification will reduce the likelihood of success of the potential VAT reclaim.

According to another embodiment, the user eligibility for the VAT refund is determined, for example, respective of a purchase type for which the VAT refund is requested. It is determined if the purchase type is a business expenditure of a business included in the list of businesses in which a VAT refund is possible. Moreover, it is checked whether the minimum purchase as it is recorded in the VAT receipt is suitable based on, e.g., the minimum required total purchase price for the VAT refund.

According to yet another embodiment, one or more errors in the VAT receipt may be identified. An error may be, but is not limited to, missing or partial information, unclear information, a combination thereof, etc. Such an error may occur when information respective of the applicant who submitted the VAT receipt and/or information respective of goods mentioned in the VAT receipt is not disclosed appropriately. As a non-limiting example, if the price of the goods is blurred or otherwise obscured on the receipt, an error may be identified. Identification of one or more errors will reduce the likelihood of success of the potential VAT reclaim. In such a case, a request for corrective action necessary to produce a qualified VAT receipt and increase the success rate may be sent, as described in greater detail herein above.

It should be noted that the VAT receipt is analyzed respective of information that may be retrieved from a database (e.g., the database 160). Such information may be related, for example, to the country where the VAT reclaim is issued, the residence of the user, one or more parameters related to the purchased product, and combinations thereof. It also should be noted that some countries require an original VAT receipt and, if such an original receipt is not received, the likelihood of success for a VAT reclaim are significantly reduced.

In S350, the likelihood of success of the VAT reclaim is determined respective of the VAT receipt analysis and the retrieved information. Determination of likelihood of success of VAT reclaims is discussed further herein below with respect to FIG. 6. In S360, it is checked whether there are additional requests and if so, execution continues with S310; otherwise, execution terminates.

A person of ordinary skill in the art would readily appreciate that the operation of the VAT reclaim processing as described in FIG. 2 and the prediction of VAT reclaim success as described in FIG. 3 may be utilized in tandem without separating from the scope of either embodiment.

Figure 4:
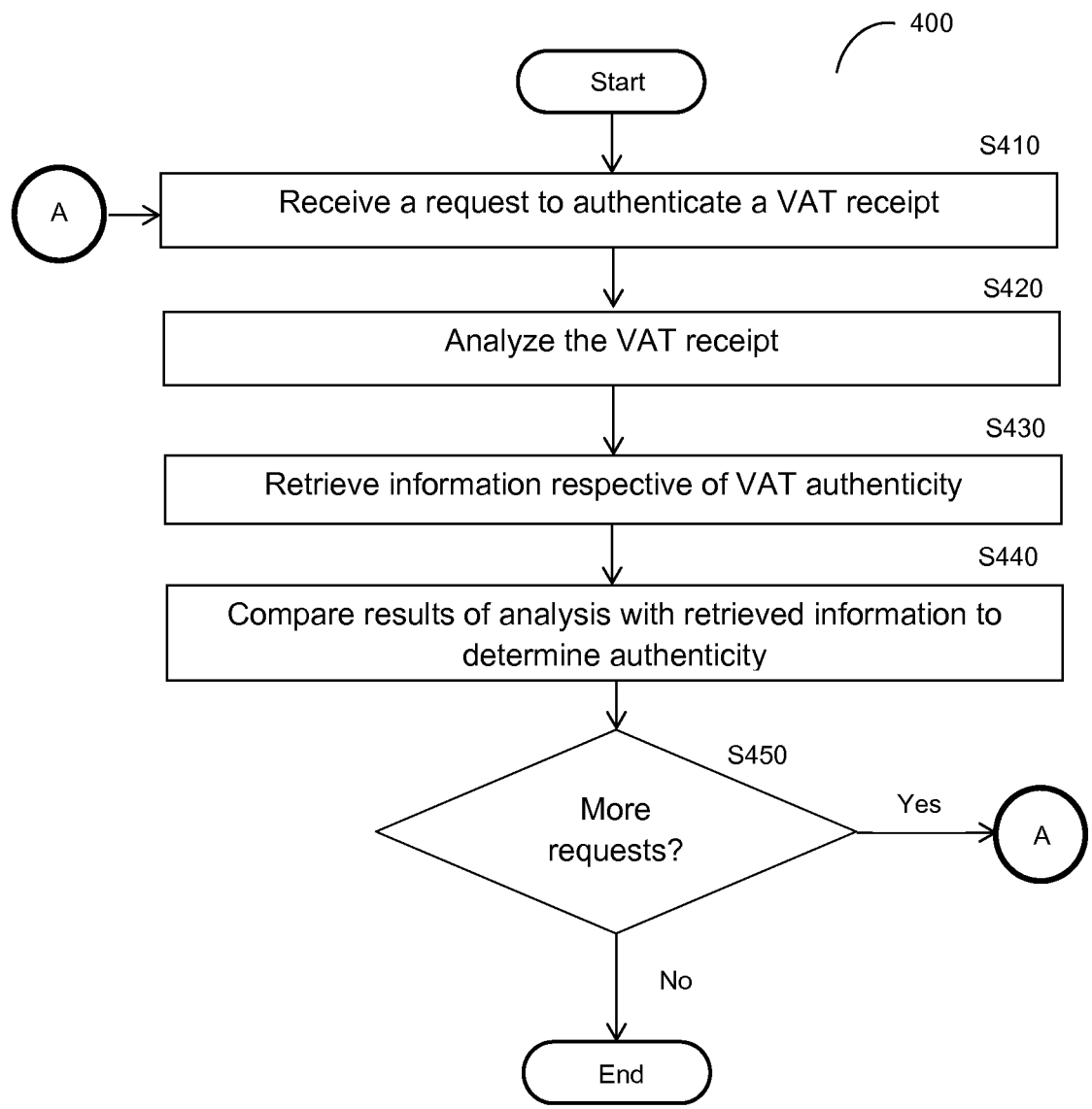
FIG. 4 is a flowchart illustrating authentication checking according to an embodiment.

FIG. 4 is a flowchart illustrating authentication checking according to an embodiment. In S410, a request to authenticate a VAT receipt is received. In S420, the VAT receipt is analyzed to determine receipt information that may be pertinent to authenticity. Analysis of a VAT receipt may include, but is not limited to, scanning the receipt, determining information contained in the VAT receipt based on digital image and/or word recognition, receiving information from a user or business, and so on. Information that is pertinent to authenticity may be, but is not limited to, items sold, invoice designation of items, store name, store address, and the like.

In S430, information pertinent to VAT authenticity checking is retrieved. In an embodiment, such information may be retrieved from a database (e.g., database 160). Information that is pertinent to authenticity checking may include, but is not limited to, statutory formal requirements and classifications of goods and/or services. Classifications of goods and/or may be utilized, for example, to determine if the information analyzed from the VAT receipt with respect to specific goods and/or services sold generally reflects the type of invoice.

In S440, the results of the analysis are compared with the retrieved information to determine authenticity. If the information matches or is otherwise sufficiently matching, the receipt may be determined as authentic. Sufficiency of matching may be predefined by, e.g., a refund agency. In S450, it is checked whether more requests have been received. If so, execution continues with S410. Otherwise, execution terminates.

As a non-limiting example, a VAT receipt is received. The VAT receipt is analyzed and it is determined that the VAT receipt indicates a purchase of a book. In this example, books do not qualify for VAT refunds since they are not subject to VATs. Information indicating either that the store that sold the book or the invoice itself deals with electronics, and not books, is retrieved. Upon comparing the result of the analysis with the results of the retrieval, it is determined that the category of the good (book) does not match the category of the invoice (electronics). As a result, the receipt is found to be unauthentic.

Figure 5:
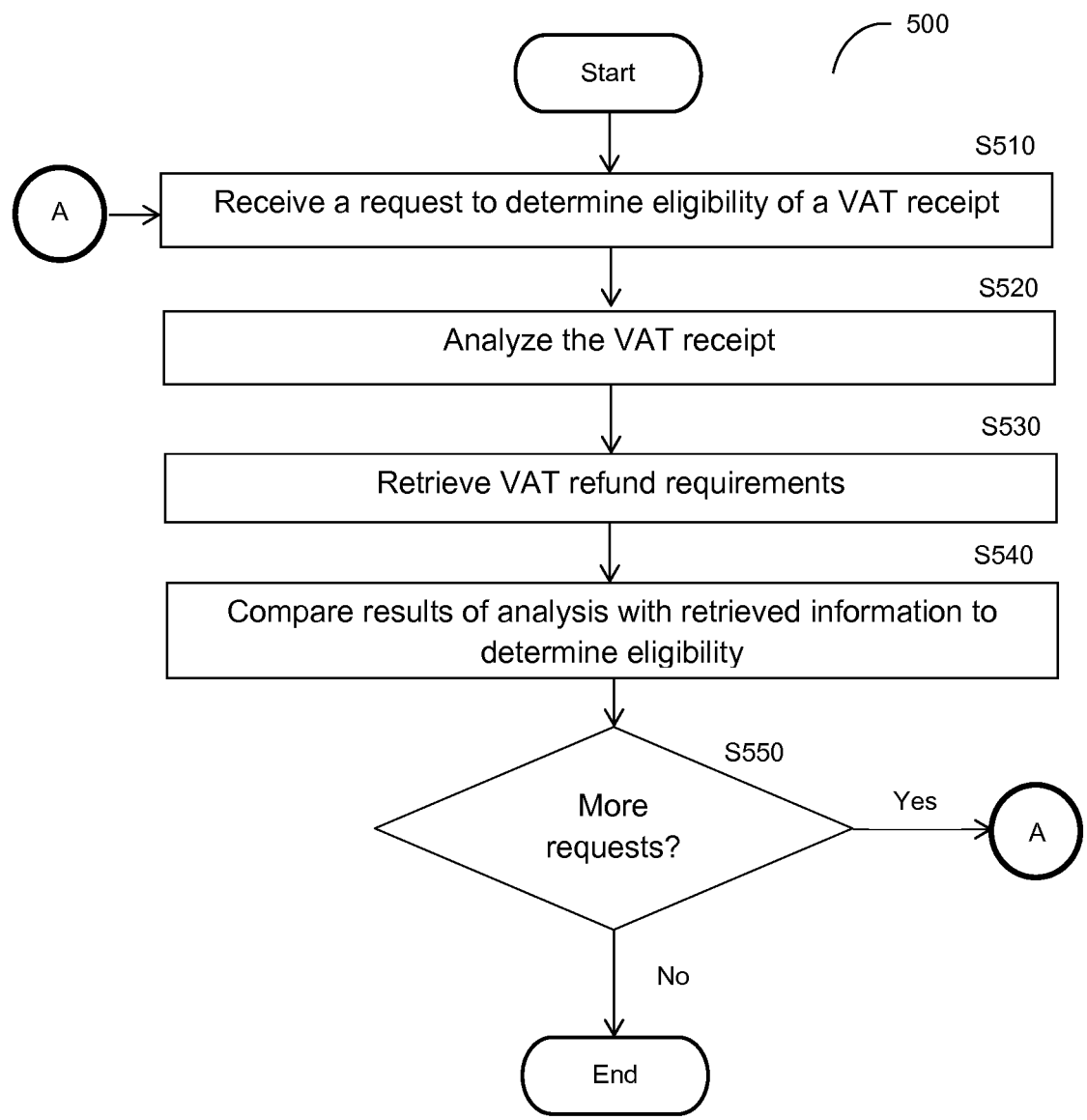
FIG. 5 is a flowchart illustrating eligibility checking according to an embodiment.

FIG. 5 is an exemplary and non-limiting flowchart illustrating eligibility checking according to an embodiment. In S510, a request to determine eligibility of a VAT receipt is received. In S520, the VAT receipt is analyzed to determine receipt information that may be pertinent to eligibility. Analysis of a VAT receipt may include, but is not limited to, scanning the receipt, determining information contained in the VAT receipt based on digital image and/or word recognition, receiving information from a user or business, etc. Information pertinent to eligibility may include, but is not limited to, types of items sold, price of each item, total price of items, location of business, date of purchase, and the like.

In S530, VAT refund requirements are retrieved. In an embodiment, these requirements may be retrieved from a database (e.g., database 160) being pre-populated with such requirements. VAT refund requirements may include, but are not limited to, inclusion in an eligible category of goods, minimum required purchase total, time period for eligibility, and the like.

In S540, the results of the analysis are compared to the results of the retrieval to determine whether the receipt is eligible for a VAT refund. If the information matches or is otherwise sufficiently matching, the receipt may be determined as eligible for a VAT refund. Sufficiency of matching may be predefined by, e.g., a refund agency. In S550, it is checked whether additional requests have been received. If so, execution continues with S510. Otherwise, execution terminates.

As a non-limiting example, a VAT receipt is received. The receipt is analyzed and it is determined that the receipt indicates a purchase of a book. Information regarding classifications of goods and services that do not qualify for a VAT refund is retrieved. This classification information indicates that books do not qualify for the VAT refund. Upon comparing the result of the analysis with the results of the retrieval, it is determined that the receipt for purchase of a book is ineligible for a VAT refund.

Figure 6:
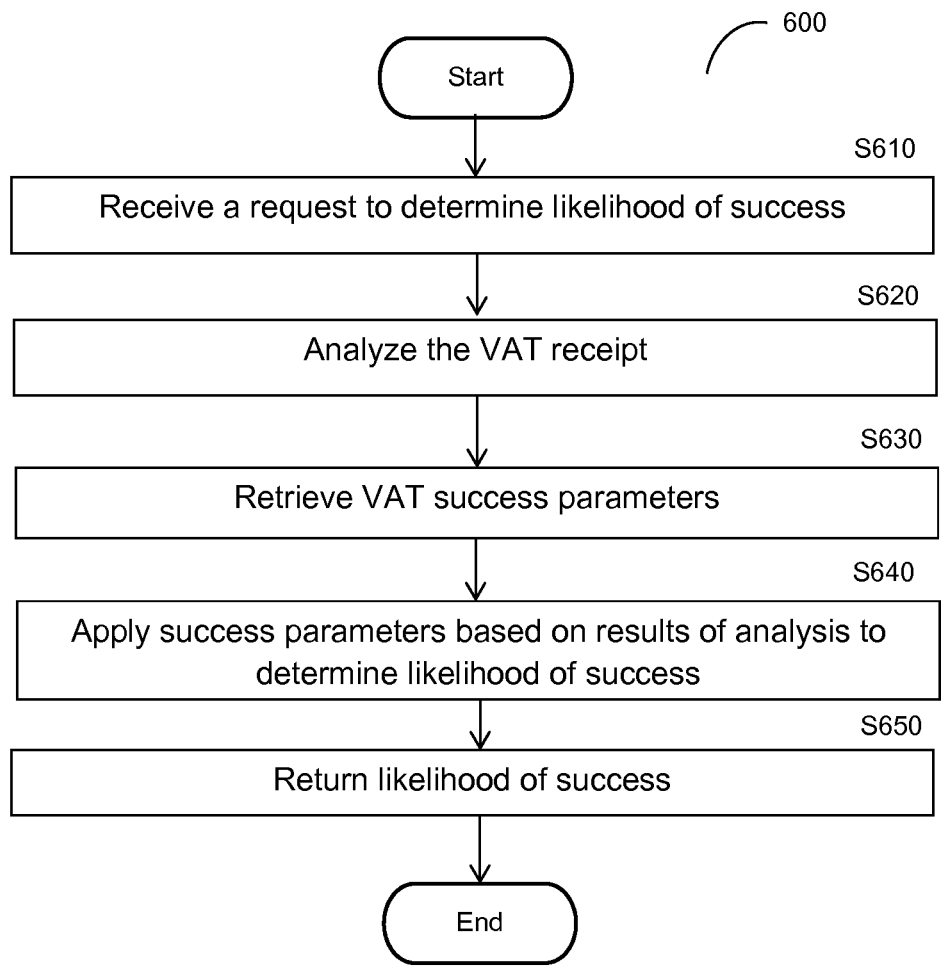
FIG. 6 is a flowchart illustrating determination of likelihood of success of a VAT refund according to an embodiment.

FIG. 6 is a non-limiting and exemplary flowchart S350 describing in further detail that step determination of likelihood of success according to an embodiment. In S610, a request to determine likelihood of success for obtaining a refund of a VAT receipt is received.

In S620, the VAT receipt is analyzed to determine receipt information that may be pertinent to likelihood of success. Analysis of a VAT receipt may include, but is not limited to, scanning the receipt, determining information contained in the VAT receipt based on digital image and/or word recognition, receiving information from a user or business, etc. Information that may be pertinent to likelihood of success may include, but is not limited to, information pertinent to authentication, information pertinent to eligibility, markings demonstrating whether the receipt is an original, whether there is blurring or other difficulty reading the VAT receipt that may result in an error as discussed further herein above, and the like. Information pertinent to authenticity and information pertinent to eligibility are discussed further herein above with reference to FIGS. 4 and 5, respectively.

In S630, VAT success parameters are retrieved. In an embodiment, such parameters may be retrieved from a database (e.g., database 160). In one embodiment, VAT success parameters may be numerical values (e.g., 0, 1, 2, 0.5, etc.) or predefined weights associated with certain conditions that can be multiplied with other success parameters to determine a likelihood of success of receiving a VAT refund. In an embodiment, such weights are each between 0 and 1 inclusive. In another exemplary embodiment, the VAT success parameters may be assigned with a binary value '1' or '0'. For example, information indicating that a VAT receipt is authentic may be associated with a VAT success parameter having a value of 1, while information indicating that a VAT receipt is not authentic may be associated with a VAT success parameter having a value of 0.

In S640, the results of the analysis are used to determine which success parameters to apply based on the satisfied or unsatisfied condition. The condition is determined based on the refund regulations governed by a certain country. Then, the determined parameters are applied to find the likelihood of success. Application of success parameters may include multiplying such parameters or utilizing statistical measures on such parameters to obtain a success measure. This success measure may be, e.g., a percentage, a numerical value, and the like determining a likelihood of success for a VAT refund. In S650, the success measure is returned. In an embodiment, a refund success indication is produced based on the success measure indicating the eligibility for a refund. This may include comparing the computed or otherwise determined success measure to a predefined threshold. If the measure exceeds the threshold, the user is eligible for a refund; otherwise, the user is ineligible.

As a non-limiting example ("Example 1") of determination of likelihood of success, a request to determine a likelihood of success is received. The receipt is scanned and information indicating that the receipt is authentic, that the receipt is eligible, and that the receipt is obscured along a small portion of the top edge are determined. Success parameters related to these general categories (i.e., authenticity, eligibility, and obscurity) are retrieved from a database (e.g., database 160).

In this example, an authentic VAT receipt is associated with a success parameter having a value equal to 1, an unauthentic VAT receipt is associated with a success parameter having a value equal to 0, an eligible VAT receipt is associated with a success parameter having a value equal to 1, and an ineligible receipt is associated with a success parameter having a value equal to 1. Additionally, obscurity is associated with a success parameter that varies depending on the area of the VAT receipt that is obscured relative to the total receipt area and upon the location of the obscurity relative to the rest of the receipt. In this case, since there is only a small relative area of obscurity, and the obscurity is not likely to be blocking significant information (the topmost edge of a receipt frequently lacks significant information), the success parameter related to obscurity is retrieved as 0.9.

Based on the success parameters, the likelihood of success may be determined. In this example, determination is based on multiplication of the success parameters. Thus, $(1)*(1)*(0.9)=0.9$, which may be returned as, e.g., 0.9 or as 90%. This indicates a 90% likelihood of successfully receiving a VAT refund based on the analyzed VAT receipt.

As another limiting example ("Example 2"), a VAT receipt as in Example 1 is determined to be ineligible for a refund rather than eligible. In Example 2, this ineligibility results in a success parameter associated with eligibility of 0. Consequently, the likelihood of success is determined to equal $(1)*(0)*(0.9)=0$. Therefore, in Example 2, the likelihood of success is determined to be 0%.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for predicting a likelihood of success of a potential value-added tax (VAT) reclaim, comprising:
   receiving, by a server including a digital image processor, at least one VAT receipt;
   analyzing, by the server, the at least one VAT receipt, wherein the analysis includes at least determining, via digital image recognition, information contained in the at least one VAT receipt and whether a portion of each VAT receipt is obscured;
   retrieving, based on the VAT receipt analysis, at least one VAT success parameter, wherein the at least one VAT success parameter includes at least one obscurity success parameter, wherein each obscurity success parameter represents a relative obscurity of an obscured portion with respect to one of the at least one VAT receipt;
   computing a success measure using the at least one VAT success parameter; and
   determining, based on the computed success measure, the likelihood of success of the potential VAT reclaim.

2. The computerized method of claim 1, wherein each VAT success parameter is associated with at least one of: at least one parameter related to the user, at least one parameter related to a place of purchase, at least one parameter related to the user resident, at least one parameter related to the purchased product, at least one parameter related to the purchase price, at least one VAT receipt, and a plurality of conditions respective of laws related to VAT refund in a variety of countries.

3. The computerized method of claim 2, wherein the plurality of conditions related to the VAT refund include at least one of: a minimum purchase required, a list of businesses in which a VAT refund is possible, an obligation to disclose all information needed based on goods that are mentioned in a VAT receipt, and an obligation to disclose all needed information of the user.

4. The computerized method of claim 1, further comprising:
   determining authenticity of the at least one VAT receipt.

5. The computerized method of claim 1, further comprising:
   determining eligibility for VAT refund for the at least one VAT receipt, wherein the at least one VAT success parameter includes the determined eligibility.

6. The computerized method of claim 1, further comprising:
   identifying at least one error in the at least one VAT receipt, wherein each error is any of: missing information, and unclear information.

7. The computerized method of claim 6, further comprising:
   sending a request for corrective action upon identification of at least one error.

8. The computerized method of claim 3, wherein information respective of a likelihood of success further comprises a plurality of success parameters associated with the plurality of conditions related to the VAT refund.

9. A non-transitory computer readable medium having stored thereon instructions for causing one or more processing units to execute the method according to claim 1.

10. A system for predicting a likelihood of success of a potential value-added tax (VAT) reclaim, comprising:
    a processor; and
    a memory, wherein the memory contains instructions that, when executed by the processor, configure the system to:
    receive at least one VAT receipt;
    analyze, by the server, the at least one VAT receipt, wherein the analysis includes at least determining, via digital image recognition, information contained in the at least one VAT receipt and whether a portion of each VAT receipt is obscured;
    retrieve, based on the VAT receipt analysis, at least one VAT success parameter, wherein the at least one VAT success parameter includes at least one obscurity success parameter, wherein each obscurity success parameter represents a relative obscurity of an obscured portion with respect to one of the at least one VAT receipt;
    compute a success measure using the at least one VAT success; and
    determine, based on the computed success measure, the likelihood of success of the potential VAT reclaim.

11. The system of claim 10, wherein each VAT success parameter is associated with at least one of: at least one parameter related to the user, at least one parameter related to a place of purchase, at least one parameter related to the user resident, at least one parameter related to the purchased product, at least one parameter related to the purchase price, at least one VAT receipt, and a plurality of conditions respective of laws related to VAT refund in a variety of countries.

12. The system of claim 11, wherein the plurality of conditions related to the VAT refund include at least one of: a minimum purchase required, a list of businesses in which a VAT refund is possible, an obligation to disclose all information needed based on goods that are mentioned in a VAT receipt, and an obligation to disclose all information needed respective of the user.

13. The system of claim 10, wherein the system is further configured to:
    determine authenticity of the at least one VAT receipt.

14. The system of claim 10, wherein the system is further configured to:
    determine eligibility for a VAT refund for the at least one VAT receipt, wherein the at least one VAT success parameter includes the determined eligibility.

15. The system of claim 10, wherein the system is further configured to:
    identify at least one error in the at least one VAT receipt, wherein each error is any of: missing information, and unclear information.

16. The system of claim 15, wherein the system is further configured to:
    send a request for corrective action upon identification of at least one error.

17. The system of claim 10, wherein information respective of a likelihood of success further comprises a plurality of success parameters associated with the plurality of conditions related to the VAT refund.

18. The method of claim 1, further comprising:
    determining, based on the VAT receipt analysis and the at least one condition associated with each VAT success parameter, at least one VAT success parameter to be applied, wherein determining the likelihood of success is further based on the at least one VAT success parameter to be applied.

19. The method of claim 1, wherein each obscurity has a size and a position relative to one of the at least one VAT receipt, wherein each obscurity parameter is based on the relative size and the relative position of a corresponding obscurity.

\* \* \* \* \*